(12) United States Patent  
Gudjonsson et al.

(10) Patent No.: US 8,352,068 B2
(45) Date of Patent: Jan. 8, 2013

(54) METHOD AND A SYSTEM FOR TRACKING FOOD ITEMS

(75) Inventors: Petur Gudjonsson, Reykjavik (IS); Kristinn A. Kristinsson, Reykjavik (IS); Kristjan Hallvardsson, Kopavogur (IS); Bjorn Thorvaldsson, Gardabaer (IS)

(73) Assignee: Marel HF, Gardabaer (IS)

( * ) Notice: Subject to any disclaimer, the term of this patent is extended or adjusted under 35 U.S.C. 154(b) by 1055 days.

(21) Appl. No.: 10/581,028

(22) PCT Filed: Nov. 26, 2004

(86) PCT No.: PCT/IS2004/000020
§ 371 (c)(1),
(2), (4) Date: Jun. 25, 2007

(87) PCT Pub. No.: WO2005/052704
PCT Pub. Date: Jun. 9, 2005

(65) Prior Publication Data
US 2007/0293980 A1 Dec. 20, 2007

(30) Foreign Application Priority Data

Nov. 28, 2003 (IS) .............................................. 7059

(51) Int. Cl.
*G06F 7/00* (2006.01)

(52) U.S. Cl. ....................................................... 700/223
(58) Field of Classification Search .................. 700/115, 700/223, 224
See application file for complete search history.

(56) References Cited

U.S. PATENT DOCUMENTS

| 6,104,966 | A * | 8/2000 | Haagensen | 700/116 |
| 6,148,249 | A * | 11/2000 | Newman | 700/225 |
| 6,546,304 | B2 * | 4/2003 | Thorvaldsson et al. | 700/115 |
| 6,587,575 | B1 | 7/2003 | Windham et al. | |
| 7,261,130 | B2 * | 8/2007 | Porter et al. | 141/129 |
| 2003/0182199 | A1 | 9/2003 | Kwang, II | |
| 2004/0177011 | A1 * | 9/2004 | Ramsay et al. | 705/28 |

FOREIGN PATENT DOCUMENTS

FR 2 813 683 3/2002

* cited by examiner

*Primary Examiner* — Ramya Burgess
(74) *Attorney, Agent, or Firm* — Nixon & Vanderhye PC

(57) ABSTRACT

The invention relates to an apparatus for processing food wherein food items are conveyed through processing stations where they are cut into pieces and optionally mixed with items originating differently. In particular, the invention relates to a system wherein information related to each food item and the positions of the food items throughout the processing are traced so that the origination of a food item is preserved.

17 Claims, 2 Drawing Sheets

METHOD AND A SYSTEM FOR TRACKING FOOD ITEMS

Figure 1:
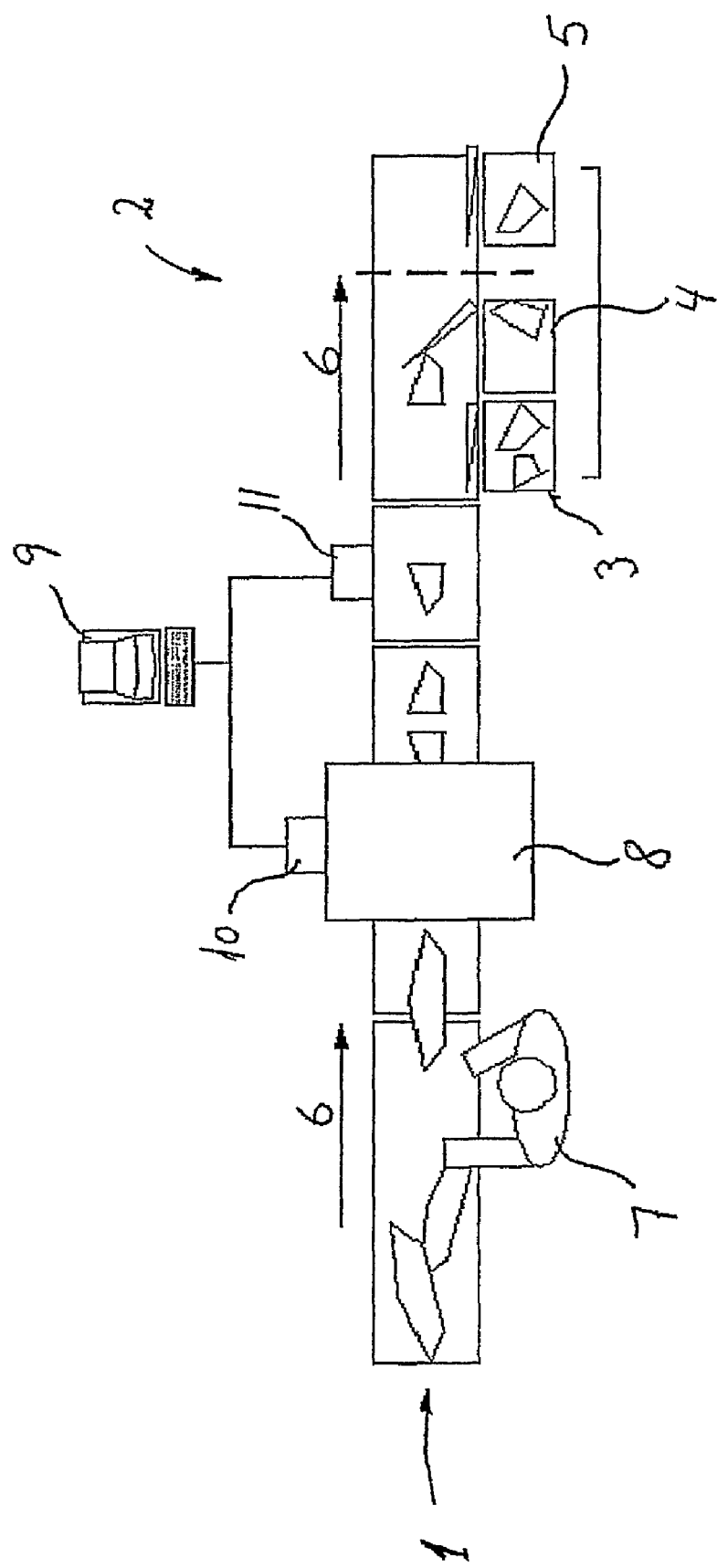

This application is the U.S. national phase of International Application No. PCT/IS2004/000020 filed 26 Nov. 2004, which designated the U.S. and claims priority to IS 7059 filed 28 Nov. 2003, the entire contents of each of which are incorporated herein by reference.

INTRODUCTION

The present invention relates to an apparatus for processing food wherein food items are conveyed through processing stations where they are cut into pieces and optionally mixed with items originating differently. In particular, the invention relates to a system wherein information related to each food item and the positions of the food items throughout the processing are traced so that the origination of a food item is preserved.

BACKGROUND OF THE INVENTION

In food processing industries, traceability is an important aspect, especially since BSE was diagnosed in Europe. Even though focus mainly has been on meat products, the need for traceability of food products in general is increasing.

Typically, food products are processed, batched and packed in production lines wherein process equipment and workers are placed along conveyer lines. Often, and in particular in meat processing lines, large items, e.g. whole animals or large parts of animals are brought into one end of the process line from which end the items move towards an opposite end while they are sliced into various cuts, trimmed and optionally processed further before the sub-items end in food products, e.g. in a precooked meal or in packages with slices of meat. With regards to contamination and bacterial control, it is desirable to keep items of different origination completely separated. Separation, inevitably, implies time consuming, and costly logistic problems as well as increased loss when residual food items are too small to be used in the final product. It is therefore normal to mix items of various originations during food processing.

In existing food processing systems, food products can normally be traced back to a certain production date or period. The traceability primarily relies on batching of production series into food batches, wherein one food batch could represent production of a certain food product within a certain time frame. The food products are normally grouped into batches under consideration of required processes so that a batch e.g. requires trimming and cutting according to certain quality standards or the food products may be grouped based on their final destination, e.g. one batch of food items are to be shipped to a specific country. Due to the relatively rough grouping of the food products into batches, it happens that large amounts of finished products must be called back for destruction, e.g. due to contamination caused by items of one single origination, e.g. one animal carrying BSE, or due to contamination of a single production facility, e.g. contamination of a single circular saw out of many.

Manual registration of entering food items and labelling of the items as they pass through various processes do not solve the problem completely. Not least due to the repeated moving around with tags and the limited abilities of fastening tags to food items, e.g. under wet or humid conditions, and not least when items of various originations are combined in food products, the origination appearing on a label can be vitiated by errors and due to the degree of uncertainty combined with the seriousness involved in distribution of infected and possible injurious food products, it frequently happens that food producing industries dispose large quantities of food.

DESCRIPTION OF THE INVENTION

It is an object of a preferred embodiment of the present invention to provide means making tracing of meat simpler and reducing risk of loss in large scale meat processing facilities. Accordingly, the present invention in a first aspect provides a method of operating a combined information handling and food processing system wherein items can be conveyed between processing means while a computer system traces its position and preserves information representing its origination while the food is processed, said method comprising the steps of:

storing a data set of a first type representing origination of an item in memory of a computer system, conveying the item to process means for separation of the item into sub-items while the positions of the item and the sub-items are traced by the computer system, selecting sub-items for a batch, and assigning data from the data set of the first type representing the origination of the item to the batch.

Due to the storing of data in memory of the computer system, the tracing of the positions of the item and sub-items of the item and the assigning of data representing origination of the item to batches of sub-items, it is possible to trace the origination of items in a batch of items even though the sub-items are mixed from items of different originations. Since the data is preserved in the memory of a computer system rather than on labels, the certainty of the origination of items in a food product is highly improved and the process of moving labels and duplicating labels between items and sub items during the processing is eliminated.

The food processing system could be provided with a food item intake wherein the origin of the food item is registered, a number of processing stations wherein the food item is separated by cutting into sub-items and wherein the sub items are weighed on a scale, e.g. in a weighing machine, e.g. on dynamic scales while they are conveyed. Finally, the food items are rejected from the conveyer system into receptacles such as bins wherein batches of food sub-items are formed. The selection of sub-items for batches may be based on a weight criterion for the batches. The food items could be meat, fish, vegetables, fruit and similar items and the separation process of the items into sub items could be the process of removing bones from meat, slicing food into slices, trimming of fat or removing impurities, peels, husks or shells etc.

In order to preserve the information relating to the origination of the items in a database rather than having to affix the information physically to the batches before they leave the system, a data set of a second type which comprises data from the data set of the first type representing the origination of at least one item and an identifier identifying the batches may be formed.

Large quantities of food products may have to be disposed when food items originating from different locations are mixed in the batches, and for the reason of uncertainty, food producing industries can charge more money for food products containing food of only one single or a few originations. Accordingly, the method may comprise forming of batches of a first type from sub-items of items of a single origination. Residual amount of sub-items from one origination which is insufficient for filling one batch may be used for batching a second type of batches with a mixed content. In fact, the same system may be used for batching the batches of the first type and batches of the second type simultaneously as food items are conveyed through the system.

A decision on disposal of a food product or the evaluation of the quality of the food product can be based on knowledge about the processing of the food product. As an example, the risk of spreading BSE from the spinal marrow depends on the method of quartering and cutting up the animal. Moreover, information on the processing of the meat can be used for determining the original condition of the food product prior to the processing. Accordingly, the data set of the second type may include information relating to the processing of an item or sub-item and may further include information identifying a processing resource or facility which has been in contact with the item or sub-item, e.g. a circular saw, a process worker, a part of the conveyor belt etc. This information can be used for tracing food items which have been in contact with infected equipment or which have been processed by a worker carrying an infection.

In a batching process, batches are normally formed under consideration of requirements defined by a contract between a delivering and a receiving part, and most often, minimum weight of the batch is a key issue. Normally, the part of the batch which exceeds the minimum weight is counted by the delivering part as a loss and therefore batching machines normally select items for batches in order to end up with batches exceeding the minimum weight as little as possible. In one embodiment of the present invention, wherein batches of the second type comprises mixed items, it may however be an advantage to select items for batches under a criterion wherein the number of different origins of the sub-items is within a predetermined range, e.g. in order to minimize the number of different origins. In one batching cycle, a first and a second item, e.g. sub items, may be selected for a given batch. By selecting the first item, the overweight of the batch might be lower than by selecting the second item. If, however, the second and not the first item, originates from the same place as other items of the batch, the second item may be selected for the batch. In one embodiment of the invention, items are selected for batches in accordance with a batching criterion based on the weight of the item, the weight of the batch and the origination of the item versus the originations of the items already in the batch.

Subsequent to the batching of the items, the batches may be loaded into packages to which data from the first or second set of data have been assigned. This enables at least one origination of sub-items in that package, or the identity of the package to appear on the label of the package. Alternatively, or in addition thereto, the identity of resources or facilities which have been in contact with sub-items in that package may appear on the label. Particularly for a given item or a processing station performing breakdown of the item into sub-items or an operator assigned to a processing station, it is possible to identify all packages that include sub-items from the given item, or it is possible to identify the packages that were processed at the given processing station or that were handled by the given operator. Furthermore, given a pack with a contaminated sub-item, all packs with sub-items originating from the same item or packs which went through the same process stations or were handled by the same operator as the contaminated sub-item, can be identified.

In a second aspect, the present invention relates to a combined information handling and food processing system comprising:
  a conveyer for conveying a food item to process means for separation of the item into sub-items,
  a computer with memory, the computer being adapted to:
    store a data set of a first type representing origination of an item in the memory,
    select sub-items for a batch, and
    assign data from the data set of the first type representing the origination of the item to the batch.

The system could be adapted to work in accordance with the method described for the first aspect of the invention. In particular, the system could be provided with automatic sensing means such as bar code or RFID-tag readers for registering origination data into the memory of a computer system when food items enters the system. Label printers may print and affix labels with origination data to packages formed by the system, or, the labels may contain identification data for identifying the package. If the origination of the content of one package is requested, the information may be retrieved from a computer database system keeping a record of package ID's of a package and corresponding origination data for its content.

DETAILED DESCRIPTION OF THE INVENTION

Figure 2:
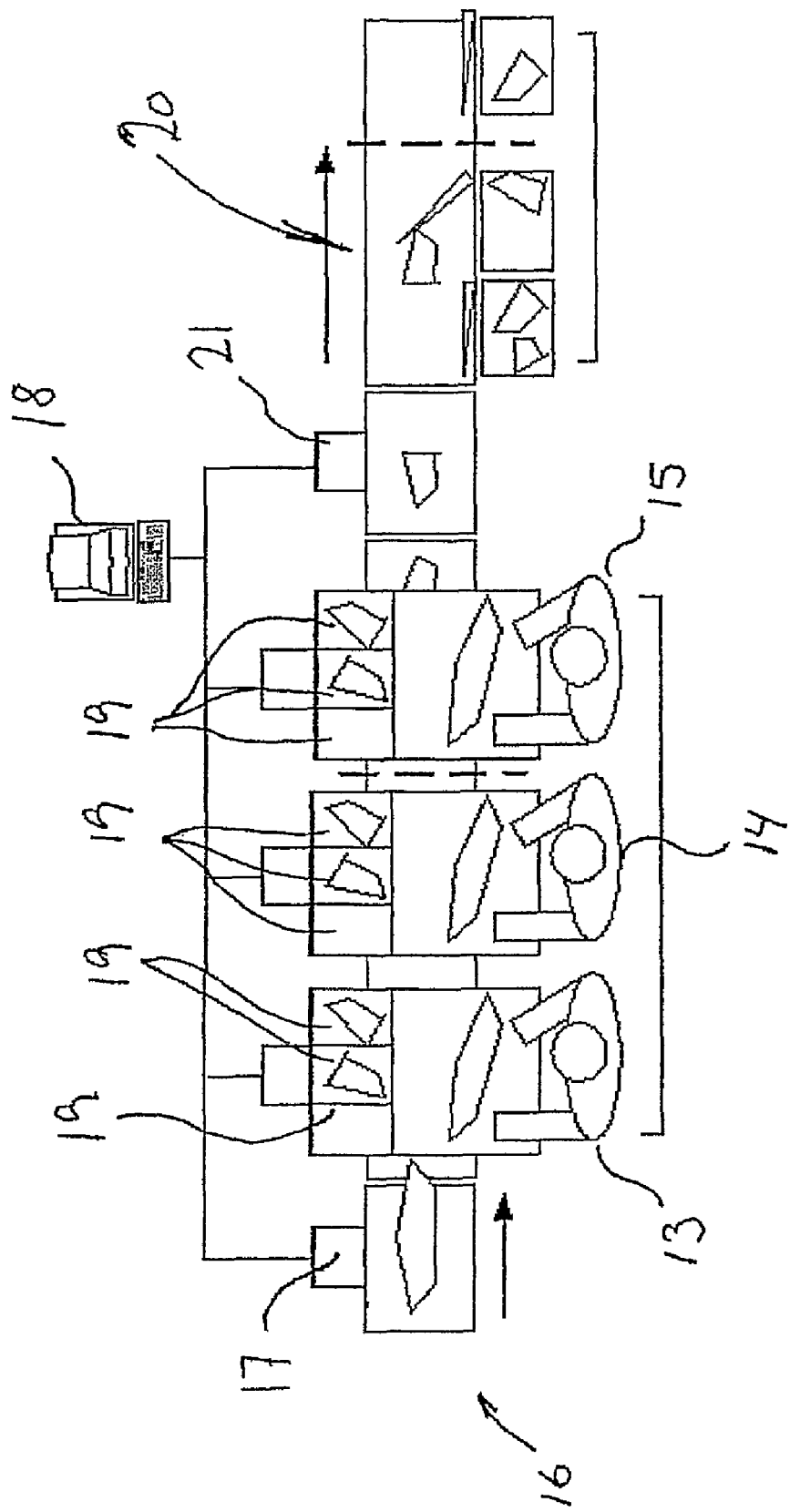

In the following, a preferred embodiment of the invention will be described in further details with reference to the drawing in which:

FIGS. 1 and 2 show systems according to the present invention.

FIG. 1 shows an integrated food processing and information handling system according to the present invention. The system comprises a conveyor comprising a transport belt carrying the items from an item intake 1 towards a batching area 2 comprising discharging arms for shifting the items from the conveyor belt into a collecting bin. In the disclosed situation, three receptacles 3, 4, 5 holding selected sub-items for forming batches or packs have received in total 4 items and a fifth item is about to enter the second bin 4. The arrows 6 indicate the conveying direction of the belt. The system is operated by a person 7 who, in addition to operating the system, may process the items, e.g. by trimming meat items. The system has a computer controlled processing station 8 for separation of items into sub-items. The computer controlled processing station could comprise a computer controlled knife which cuts pieces of meat into smaller pieces. The processing station may be controlled e.g. by information relating to the size, shape, weight, colour, water content, specific gravity etc., and the information may be keyed into the system by the operator, or the information may be determined by sensor systems, e.g. comprising a scale, a camera or an X-ray detector etc. arranged along the conveyor 1.

A host computer 9 is connected to sensors 10 and 11. The sensors collect data sets relevant for the traceability of the meat and forward the data to the host computer. A data set of a first type is stored in the computer system. The data represents the origination of the item entering the system, e.g. from which animal, or from which farm, or from which country a piece of meat originates. The data is generated e.g. when the animal enters a slaughterhouse, at which point the data may be stored in an electronic tags which are attached to pieces of meat from that animal. In the computer controlled processing station 8, the information in the tags is retrieved by the sensor 10, and the information is entered into a memory area of the computer system 9. At this point, the meat is cut into smaller pieces, and each piece is conveyed to selected receptacles of the system. For each selection of a piece of meat to a batch, information is assigned from the data set of the first type to the batch, and the host computer 9 stores in memory data sets which, for each receptacle, represents originations of items included in that receptacle.

In FIG. 2, the system is disclosed with the amendment that the separation of the entering items into sub-items is done manually by operators 13, 14, 15. Likewise the system of FIG. 1, the operator receives a piece of meat from an intake 16. At the location of the intake, a sensor 17 transmits a data signal representing the origination of the item, e.g. a farm from which a piece of me at originates, to the host computer 18. Further sensors, e.g. a scale for determining the weight of the items, may be arranged in the intake. The host computer assigns the entering items to individual process workers or processing stations for manual breakdown or separation of the items. After separation of the items into sub-items (carried out by operators), information concerning the origination is assigned to each of the items in the sub-receptacles 19. The sub-receptacles are emptied onto the main conveyor 20 by activation of releasing means (not shown) controlled by the host computer. On the main conveyor, the position of each item is traced by a sensor 21 before a receptacle is selected for the items and they are discharged from the main conveyor.

The invention claimed is:

1. A method of operating a combined information handling and food processing system wherein food item pieces can be conveyed between processing means while a computer system traces their positions and preserves information representing their originations while the food item pieces are processed, said method comprising the steps of:
storing a data set of a first type representing origination of an item in memory of a computer system,
conveying the food item pieces to process means,
separating the food item pieces into sub-food item pieces by the processing means,
selecting sub-food item pieces for a batch,
tracing the positions of the food item pieces and the sub-food item pieces using the computer system,
assigning to the batch data from the data set of the first type representing the origination of the selected sub-food item pieces selected for the batch,
assigning an identifier to the batch,
defining a data set of a second type which comprises the assigned data and the assigned identifier, and
storing the defined data set in the memory of the computer system,
the selected sub-food item pieces for the batch being a mix of sub-food item pieces from different originations.

2. The method according to claim 1, wherein the data set of the second type further comprises information relating to the processing of a food item or sub-food item piece.

3. The method according to claim 2, wherein the information relating to the processing of the food item piece or sub-food item piece comprises information identifying a processing resource or facility which has been in contact with the food item piece or sub-food item piece.

4. The method according to claim 1, wherein the selecting of sub-food item pieces for batches is based on a selection criterion wherein sub-food item pieces are combined in a batch so that the weight of the batch is within a predetermined range.

5. The method according to claim 1, wherein the selecting of sub-food item pieces for batches is based on a selection criterion wherein the sub-food item pieces are combined in the batch so that the number of different origins of the sub-food item pieces is within a predetermined range.

6. The method according to claim 1, further comprising the step of packaging a batch in a package and assigning data from the first or second set of data to the package to indicate origination of sub-food item pieces in that package.

7. The method according to claim 6, further comprising assigning data from the second set of data to the package to indicate processing resources or facilities which have been in contact with sub-food item pieces in that package.

8. A combined information handling and food processing system comprising:
a conveyer for conveying food item pieces to a processing means for separation of each of the food item pieces into sub-food item pieces, and
a computer with a memory, the computer being adapted to:
store a data set of a first type representing an origination of a food item piece in the memory,
select sub-food item pieces for a batch,
trace the positions of the food item pieces and each sub-food item pieces,
assign to the batch data from the data set of the first type representing the origination of the selected sub-food item pieces to the batch,
assign an identifier to the batch,
define a data set of a second type which comprises the assigned data and the assigned identifier, and
store the defined data set in the computer memory, the selected sub-food item pieces for the batch being a mix of sub food items pieces from different originations.

9. The system according to claim 8, adapted to select the residual amount of sub-food item pieces for batches of the second type.

10. The system according to claim 8, wherein the data set of the second type further comprises information relating to the processing of a food item piece or sub-food item piece.

11. The system according to claim 10, wherein the information relating to the processing of the food item piece or sub-food item piece comprises information identifying a processing resource or facility which has been in contact with the food item piece or sub-food item piece.

12. The system according to claim 8, wherein the selecting of sub-food item pieces for a first type of batches is based on a selection criterion wherein sub-food item pieces are combined in a batch so that the weight of the batch is within a predetermined range.

13. The system according to claim 9, wherein the selecting of sub-food item pieces for the second type of batches is based on a selection criteria wherein the sub-food item pieces are combined in the batch so that the number of different origins of the sub-food item pieces is within a predetermined range.

14. The system according to claim 8, further comprising packing equipment for packaging a batch in a package and for assigning data from the first or second set of data to the package to indicate origination of sub-food item pieces in that package.

15. The system according to claim 8, further comprising a set of electronic tags and means for transferring data between the computer and the tags, the system being adapted to receive information from one primary tag and transfer the data to a number of secondary tags, said number corresponding to the number of sub-food item pieces arising from the separation of the food item piece.

16. The system according to claim 15, further comprising a meat item separation device which is controlled by the computer to separate the food item pieces into the number of sub-food item pieces.

17. The method according to claim 1, wherein said different originations of said sub-food item pieces include data indicating from which animal the sub-item pieces originate from, from which farm the sub-item pieces originate from, or from which country the sub-item pieces originate from.

* * * * *